Sept. 19, 1967     D. G. FLECK ET AL     3,342,455
ARTICLE WITH CONTROLLED GRAIN STRUCTURE
Filed Nov. 24, 1964

Inventors
Donald G. Fleck
George D. Chandley by Hill, Sherman, Meroni, Gross & Simpson Attys United States Patent Office 3,342,455
Patented Sept. 19, 1967

3,342,455
ARTICLE WITH CONTROLLED GRAIN STRUCTURE
Donald G. Fleck and George D. Chandley, Alliance, Ohio, assignors to TRW Inc., a corporation of Ohio
Filed Nov. 24, 1964, Ser. No. 413,438
4 Claims. (Cl. 253—77)

ABSTRACT OF THE DISCLOSURE

Jet engine blades or similar articles consisting of duplex structures. The portions of the blade which must resist the greatest amount of stress and thermal shock are provided with columnar grain structures, while the airfoil portion of the blade which must resist high temperature creep is provided with an equiaxed grain structure.

---

Figure 1:
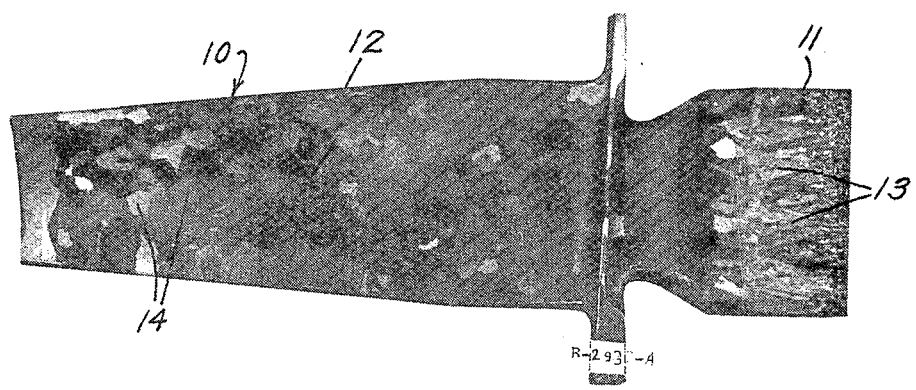

The present invention relates to improved cast articles, and to a method and apparatus for making the same.

The present invention deals with duplex castings in which the grain structure at various locations in the casting is preselected in accordance with the type and severity of conditions which are to be met in the use of the casting.

For example, the present invention is particularly applicable to the casting of jet engine blades or vanes, or other parts subject to extreme heat or thermal cycling. In this type of casting, it is desirable to make the portion subject to the highest degree of thermal stress and thermal shock, namely the root, of columnar grain structure, while the airfoil vane structure is of the equiaxed type. The advantages of having a columnar structure, oriented to the direction of maximum stress are well recognized. These include improved soundness, greater resistance to thermal cycling, improved ductility, and, in certain alloys, an increase in strength and stress rupture life.

The articles of the present invention, which include both columnar structures and equiaxed structures, provide numerous advantages. For one, the configuration of some components make it impossible to grow properly oriented columnar grains throughout the entire component. With the process of the present invention, only that portion of the part which is highly stressed or subjected to greatest thermal shock is made with the columnar structure. Furthermore, it is usually less expensive to make only a portion of the component columnar than the entire component. The time required to grow columnar grains varies exponentially as the length of the grain required, so that by reducing the amount of columnar grain growth in the piece, there is a saving of time involved.

One of the objects of the present invention is to provide an improved cast metal article with portions thereof having a columnar grain structure and other portions having an equiaxed structure so that the structure as a whole has the proper grain configuration best able to resist the environmental conditions of its use.

Another object of the invention is to provide an improved cast turbine blade in which those portions of the blade, such as the root, which are to be subject to the most critical conditions of stress and thermal shock are provided with a columnar grain structure, while the airfoil vane portion is provided with an equiaxed structure.

Still another object of the invention is to provide a method for casting which makes it possible to control grain structures and thereby provide both columnar and equiaxed grain structures in the same piece.

Still another object of the invention is to provide a method for controllably abstracting heat from preselected portions of a casting in order to provide a columnar grain structure therein, while providing an equiaxed structure in the remaining portions.

A further object of the invention is to provide an improved apparatus for the manufacture of duplex structures in which portions of the cast structure have columnar grain structures and other portions have equiaxed structures.

Until recent times, the presence of columnar zones in castings has been considered a defect. In recent times, however, it has been determined that in some applications the columnar structures are markedly superior to equiaxed structures. Columnar structures are formed by the unidirectional growth of dendrites during solidification. The relationship between the dendritic structure and the columnar grains is not exact. Each columnar grain is usually composed of more than one dendrite, and the number may vary from a few to several hundred. The interdendritic spacing is related to the solidification rate only. Columnar grain size, however, may be affected by factors other than the solidification process, such as ordinary grain growth. Despite these differences, the most convenient approach for the examination of columnar structure formation is through the study of the dendrites formed during solidification.

The primary requirement for the formation of a parallel dendritic structure is the presence of a unidirectional thermal gradient. When the metal first enters the mold, the initial solidification occurs at the mold wall due to a chill effect, assuming the mold wall to be below the solidification temperature of the metal. This chill zone consists of many fine dendrites having a random orientation. The initial freezing releases the heat of fusion, resulting in some temperature rise locally, arresting the chill zone formation. At the interface of the chill zone and the melt the dendrites begin to grow into the melt at a rate dependent upon the amount and the depth of the supercooling.

Initially, all dendrites at the chill zone-melt interface grow at equal rates, since equal supercooling is present. However, those oriented parallel to the thermal gradient are growing into an area of continued supercooling. Those oriented unfavorably cannot advance as rapidly in the direction of the thermal gradient, since only a component of the growth velocity is aligned with this gradient. The dendrites growing parallel to the gradient, since they have already undergone some growth, will give off a latent heat of fusion, due to the freezing process. This heat of fusion increases the temperature at the base of the dendrites and decreases the amount of supercooling available for growth of the more unfavorably oriented neighbors. In this manner, the growth of the misoriented dendrites is stifled, and only those aligned with the thermal gradient will undergo significant growth.

Casting variables affect columnar structure through their influence on the thermal or compositional gradients developed in the molds. These variables include metal super-heat, initial mold temperatures, the use of chills or exothermic materials, and the alloy composition. Variation of the thermal gradients within the range of columnar formation also influences the structure of the casting. If a steep thermal gradient exists, the rapid rate of heat extraction requires rapid solidification. At the same time the relatively short supercooled layer restricts the lengths of the dendrites extending into the melts. During solidification mass transport of solute between the dendrites must take place. Since the overall solidification rate is determined by the rate of heat removal, the diffusion distances must be reduced to permit the proper distribution of solute to take place. This is accomplished by increasing the number of dendrites, thus reducing the interdendritic distances. It has been experimentally verified that as the solidification rate increases, the interdendritic spacing decreases at a rate proportional to the square root of the solidification rate.

The consequences of this behavior are evident in extended columnar structures. As the distance from the mold wall increases, the dendritic spacing also increases. This can probably be attributed partially to the elimination of unfavorably oriented dendrites, but the major influence responsible is the decrease in thermal gradients as the dendrite-melt interface moves through the mold.

Comparative tests between equiaxed and columnar castings indicate that the columnar casting has marked advantages for certain applications. The high temperature strength and ductility of the columnar structures is generally superior to the equiaxed structure, and may be attributed to the preferential occurrence of gas porosity at the grain boundary locations. In the equiaxed structures the gas porosity is distributed randomly, following a grain boundary pattern. As a result, intergranular fractures occur with very low ductility. In the columna structure, the grain boundaries are oriented parallel to the growth direction. Accordingly, the porosity has little or no influence on ductility. The improvement in ductility can be attributed to several factors. The segregation normally associated with equiaxed grains is reduced by the columnar solidification process. The conditions necessary to form columnar structures are identical to those required for proper feeding. Thus, microshrinkage is almost completely eliminated. The primary reasons for improved ductility, however, appears to be the elimination of grain boundaries perpendicular to the stress axis. This prevents the normally brittle intergranular type of fracture, permitting a greater amount of deformation to occur prior to failure.

The stuctures produced according to the present invention combine the best features of columnar structures and equiaxed structures in the same casting. For example, in the manufacture of a turbine blade, the root is provided with a columnar structure, while the airfoil vane portion is provided with a fine grain, equiaxed structure. Typically, the average length of the grains in the columnar zone is on the order of ½ to 1 inch, while the average grain size in the equiaxed structure may be from about ⅛ to ½ inch. The root which in use is subjected to the greatest amount of stress and thermal shock, thus is provided with a structure which is best able to withstand such severe conditions, while the airfoil vane portion with its fine equiaxed grain structure, is better able to resist high temperature creep.

Figure 2:
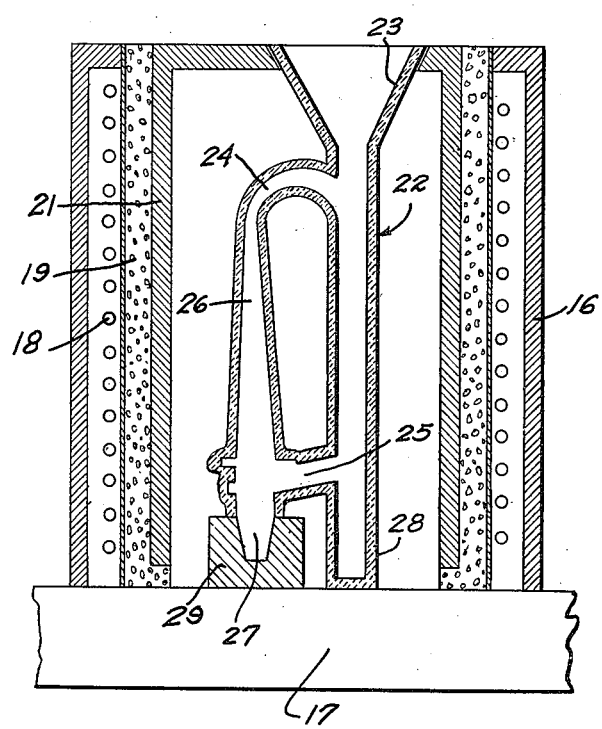

A further description of the present invention will be made in conjunction with the attached sheet of drawings in which:

FIGURE 1 is an actual photographic reproduction of a turbine blade produced according to the present invention, particularly illustrating the grain structure thereof; and FIGURE 2 is a somewhat schematic view of a furnace and casting assembly which can be used to produce the structures shown in FIGURE 1.

As shown in the drawings:

In FIGURE 1, reference numeral 10 indicates generally a turbine blade having a relatively massive root portion 11 and an airfoil vane portion 12. As shown in FIGURE 1, the root portion 11 contains a large number of columnar grains 13 whose average length may run from about ½ to 1 inch while the vane portion 12 contains a large number of equiaxed grains 14, with the average grain size running about ⅛ to ½ inch. This composite or duplex structure has been found to provide the best combination of properties without substantial increases in cost.

The furnace illustrated in FIGURE 2 of the drawings includes an outer housing 16 resting on a base 17. The housing 16 is hollow and in the hollow interior there is disposed an inductive heating element 18. A layer of thermal insulation 19 separates the induction heating coil 18 from a susceptor 21 composed of graphite or the like and constituting the inner wall of the furnace.

The mold assembly illustrated in FIGURE 2 at reference numeral 22 is preferably of the porous shell mold type. The mold 22 includes a pour cup 23 feeding a pair of ingates 24 and 25 which feed the molten metal to the vane forming portion 26 and a root forming portion 27. As seen in FIGURE 2, the bottom of the mold structure, including a downpole 28 rests on the base 17, while the root forming portion 27 is a cavity formed in a metal chill plate 29 positioned on the base 17. The metal chill plate 29 is composed of a metal having good thermal conductivity, such as copper. If desired, the chill block 29 may also be provided with additional cooling means such as a circulating coolant (not shown).

In operation, the mold is preheated, and the pouring temperature of the metal employed is adjusted in relation to the amount of preheat so that the root formed in the cavity 27 will freeze in a columnar manner, while the airfoil formed in the cavity 26 will evidence an equiaxed structure. The proper temperature differentials to be used will vary with each case, but it is a relatively simple matter to make a few preliminary tests and determine the proper temperature differential for each type of casting and each type of alloy. Typically, the mold is preheated to a temperature of 1800 to 2000° F., where the pouring temperature to metal is in the range from about 2800 to 3100° F. The metal must be poured hot enough to encourage columnar growth from the chill, and the hotter the pour, the greater the length of the columnar grain obtained, and the coarser the equiaxed grain in that portion of the casting where it exists. The mold preheat must be high enough to discourage side wall nucleation in that portion of the casting where columnar grain is desired.

A jet engine blade of the type shown in the drawings was prepared in a mold of the type shown in FIGURE 2, the mold being preheated to 1900° F., and the metal poured at 3075° F. Longitudinal and transverse metallographic samples were cut from the root and checked for microporosity. These sections proved to be extremely sound.

Room temperature tensile properties were measured using bars cut from the root, and the following values were obtained:

| Bar | Orientation | Ultimate Strength, p.s.i. | Yield Strength, p.s.i. | Percent Elong. | Percent R.A. |
| --- | --- | --- | --- | --- | --- |
| 1 | Transverse | 153,000 | 123,000 | 13 | 17.5 |
| 2 | do | 135,000 | 118,750 | 11 | 12.5 |
| 3 | Longitudinal | 139,000 | 117,000 | 12.5 | 17.5 |

The average elongation obtained in these tests was about twice that normally obtained from this configuration, using the same alloy. Since the biggest problem in utilizing this superalloy for turbine blading has been its lack of ductility, the improved structure substantially eliminated the problem.

It should be evident that various modifications can be made to the described embodiments without departing from the scope of the present invention.

We claim as our invention:

1. A cast article subject in use to varying degrees of stress and thermal shock having a columnar grain structure in those portions which must withstand the greatest amount of stress and thermal shock, and having an equiaxed structure in the portions thereof which must resist high temperature creep.

2. A cast article subject in use to varying degrees of stress and thermal shock having a columnar grain structure in which the average length of the grains is in the range from ½ to 1 inch in those portions of the article which must withstand the greatest amount of stress and thermal shock, and having an equiaxed structure having an average grain size of about ⅛ to ½ inch in the portions thereof which must resist high temperature creep.

3. A cast turbine blade having a root portion and an airfoil vane portion, said root portion consisting essentially of columnar grains and said vane portion consisting essentially of equiaxed grains.

4. A cast turbine blade having a root portion and an airfoil vane portion, said root portion consisting essentially of columnar grains having an average length in the range from ½ to 1 inch, and said vane portion consisting essentially of equiaxed grains having an average grain size in the range from ⅛ to ½ inch.

References Cited
UNITED STATES PATENTS

| | | | |
|---|---|---|---|
| 1,417,638 | 5/1922 | Sowers | 22—211 |
| 1,556,642 | 10/1925 | Smith | 22—211 |
| 2,302,030 | 11/1942 | Husarek | 22—74 |
| 2,888,244 | 5/1955 | Pekarek | 253—77 |
| 2,892,224 | 6/1959 | Bauer | 22—74 |
| 2,922,619 | 1/1960 | Siemmons | 53—77 |
| 3,260,505 | 7/1966 | Ver Snyder | 253—77 |

MARTIN P. SCHWADRON, *Primary Examiner.*

JULIUS E. WEST, EVERETTE A. POWELL, JR.,
*Examiners.*